Oct. 15, 1929.  S. J. LEWIS  1,731,820
PROCESS FOR CUTTING LAMINATED GLASS
Filed May 10, 1926
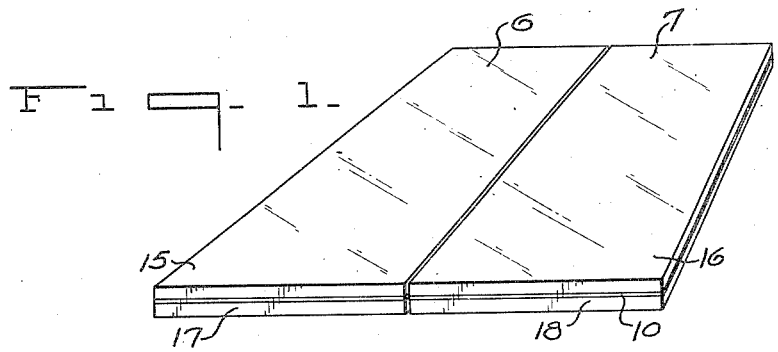
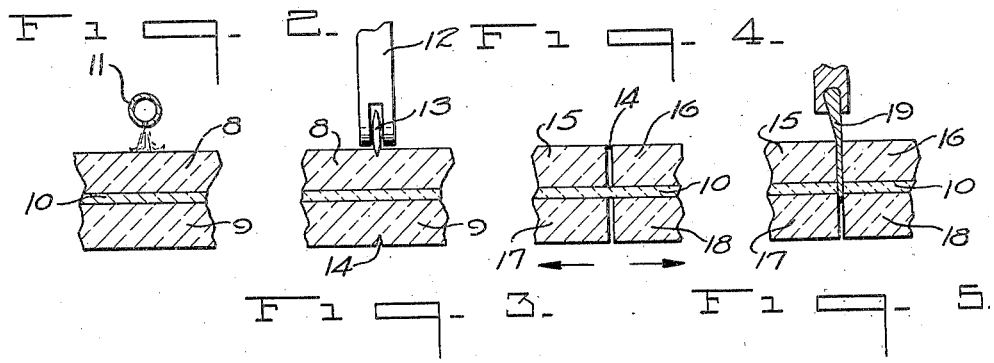
Inventor
Samuel J. Lewis.
By Frank Fraser
Attorney Patented Oct. 15, 1929

1,731,820

UNITED STATES PATENT OFFICE

SAMUEL J. LEWIS, OF TOLEDO, OHIO, ASSIGNOR TO THE LIBBEY-OWENS GLASS COMPANY, OF TOLEDO, OHIO, A CORPORATION OF OHIO

PROCESS FOR CUTTING LAMINATED GLASS

Application filed May 10, 1926. Serial No. 107,872.

The present invention relates to a method for cutting sheets of laminated glass.

An important object of the invention is to provide a method for separating a sheet of laminated glass into relatively smaller sheets and contemplates the scoring of the sheet on both sides, separating the glass, and then severing the central sheet of material.

A still further object of the invention is to provide a method for reducing laminated glass to smaller sizes, consisting in cutting or scoring the sheets of glass by means of a suitable scoring tool, heating the sheet either in its entirety or in proximity to the score lines, separating the glass sheets at the score lines, and then severing the innermost sheet by means of a sharp implement.

Other objects and advantages of the invention will become apparent during the course of the following description.

In the drawings wherein like numerals are employed to designate like parts throughout the same, Fig. 1 is a perspective view of two sheets of laminated glass produced by dividing a relatively large sheet, and Figs. 2, 3, 4 and 5, are sectional views illustrating diagrammatically the process of cutting a sheet of laminated glass.

Heretofore, in the manufacture of laminated glass, it has been necessary to make the sheets to size, as there has been no means known to cut a sheet of laminated glass into smaller sizes.

An ordinary sheet of glass can be cut by means of a hardened wheel or a diamond, by running such instrument over the surface of the glass, producing what is known as a score. After a sheet of glass has been scored, it can be easily separated.

Laminated glass, as manufactured, comprises two sheets of glass and a sheet of non-brittle material interposed therebetween. An ordinary glass scoring device cannot be used to score one exposed surface of the laminated sheet and then separate the laminated sheet as a whole as is ordinarily done in sheet glass practice, because of the sheet of non-brittle material.

In Fig. 1 are indicated two sheets of glass 6 and 7 which have been formed by dividing a single sheet into two pieces. In accordance with the present invention the two sheets of glass 8 and 9, shown in Fig. 2, which have interposed therebetween a sheet of non-brittle material 10, may be heated by means of a suitable burner or the like 11. The entire sheet of laminated glass may be heated or the sheets heated along that portion where the cut is to be made. A scoring tool 12 may be used to score both of the sheets 8 and 9, as indicated in Fig. 3. In this case the scoring tool 12 includes a hardened steel wheel 13, which forms a score 14 in the sheets of glass. Both sides of the laminated sheet are scored, the two score marks being in alignment. After the score marks have been made the sheet may be flexed slightly to create a separation as shown in Fig. 4. As is clearly shown in Fig. 4, the two sheets of glass have been separated, leaving a slight space 14 between the edges of the ends of the two sheets on both sides of the sheet 10. In other words, the two single sheets 8 and 9 have both been divided to form two sheets of double sheets 15 and 16, and 17 and 18. The two sections are stretched as indicated in Fig. 4, and a suitable cutting implement 19 is passed through the opening 14 to sever the sheet 10, completing the cutting operation.

The application of heat may be before the scoring has been done, or the heating may take place after the glass sheets have been scored and separated. Of course Figs. 2, 3 and 4 are purely diagrammatic, indicating the various steps followed in practicing the present invention.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The process of cutting laminated glass, consisting in scoring the two outer laminations of said sheet, separating each of said outer laminations in a direction substantially parallel to the plane thereof by relative movement of the same, and then severing the inner lamination.

2. The process of cutting laminated glass, consisting in scoring the two outer laminations of said sheet, separating each of said outer sheets along the score lines, then relatively moving the two pieces of at least one of the outer laminations a distance sufficient to allow the insertion of cutting means, and then cutting the inner lamination.

3. The process of cutting laminated glass, consisting in scoring the two outer laminations of said sheet, separating each of said outer sheets along the score lines by relative movement of the same, and then separating the inner lamination.

4. The process of cutting laminated glass, consisting in scoring the two outer laminations of said sheet, separating each said outer sheets by relative movement of the same along the score lines, and then separating the inner lamination along a line coincident with the lines of separation of the outer laminations.

5. The process of cutting laminated glass, consisting in separating each of the outer laminations, then heating the laminated sheet, and then separating the inner lamination.

6. The process of cutting laminated glass, consisting in separating each of the outer laminations, then heating the laminated sheet, and then cutting the inner lamination.

7. A method of cutting a composite plate comprising a pair of glass sheets with a sheet of celluloid therebetween, which consists in cracking both glass sheets along the desired line of cut, applying a heating element to one of said sheets along the line of cut to soften the celluloid, applying force to stretch the heated celluloid and cause the edges of the glass on one side of the celluloid to separate slightly, and inserting severing means through the crack thus provided to sever the celluloid sheet.

8. A method of cutting a composite plate comprising a pair of glass sheets with a sheet of strong tough material therebetween, which consists in first cracking both glass sheets along the desired line of cut, applying heat along the line of cut to soften said tough material, applying force to separate the glass edges on one side of said material, and inserting severing means between the glass edges thus separated to sever said material.

9. A method of cutting a composite plate comprising a pair of glass sheets with a sheet of strong tough material therebetween, which consists in first cracking both glass sheets along the desired line of cut, applying heat along the line of cut to soften said tough material, applying bending force to the composite sheet to separate the glass edges on the side of the plate opposite to that on which the heat is applied, and then severing said material through the space thus provided between said glass edges.

10. A method of cutting a composite plate comprising a pair of glass sheets with a sheet of celluloid therebetween, which consists in cracking both glass sheets along the desired line of cut, applying a heating element to one of said sheets along the line of cut to soften the celluloid, applying force to stretch the heated celluloid and cause the edges of the glass on the side of the celluloid remote from the heating element to separate slightly, and inserting severing means through the crack thus provided to sever the celluloid sheet.

11. The process of cutting laminated glass consisting in scoring the two outer laminations of said sheet, separating each of said outer laminations, then relatively moving the two pieces of at least one of the outer laminations a distance sufficient to allow the insertion of a severing means and then severing the inner lamination.

Signed at Toledo, in the county of Lucas, and State of Ohio, this 7th day of May, 1926.

SAMUEL J. LEWIS.